United States Patent
Hertäg et al.

(10) Patent No.: US 9,796,356 B2
(45) Date of Patent: Oct. 24, 2017

(54) BELT RETRACTOR FOR A SEAT-BELT

(71) Applicant: TRW Automotive GmbH, Alfdorf (DE)

(72) Inventors: Beate Hertäg, Leinzell (DE); Steffen Dambacher, Abtsgmünd (DE); Adrian Landbeck, Schwäbisch Gmünd (DE)

(73) Assignee: TRW Automotive GmbH (DE)

( * ) Notice: Subject to any disclaimer, the term of this patent is extended or adjusted under 35 U.S.C. 154(b) by 164 days.

(21) Appl. No.: 14/431,334

(22) PCT Filed: Sep. 25, 2013

(86) PCT No.: PCT/EP2013/002869
§ 371 (c)(1),
(2) Date: Mar. 26, 2015

(87) PCT Pub. No.: WO2014/048560
PCT Pub. Date: Apr. 3, 2014

(65) Prior Publication Data
US 2015/0224960 A1   Aug. 13, 2015

(30) Foreign Application Priority Data

Sep. 27, 2012  (DE) .................. 10 2012 019 004

(51) Int. Cl.
*B60R 22/46* (2006.01)
*B60R 22/34* (2006.01)

(52) U.S. Cl.
CPC .......... *B60R 22/46* (2013.01); *B60R 22/341* (2013.01); *B60R 22/4628* (2013.01); *B60R 2022/468* (2013.01); *B60R 2022/4642* (2013.01)

(58) Field of Classification Search
CPC .... B60R 22/46; B60R 22/341; B60R 22/4628
See application file for complete search history.

(56) References Cited

U.S. PATENT DOCUMENTS

2007/0001443 A1   1/2007  Yanagi
2012/0032018 A1 * 2/2012  Maekubo et al. ...... B60R 22/36
                                                            242/374

FOREIGN PATENT DOCUMENTS

DE       60113208      3/2006
DE     102009013923    9/2010
DE     102011012856    9/2012

OTHER PUBLICATIONS

Article entitled "Optimum Stiffener Layout for the Reduction of Vibration and Noise of Gearbox Housing", vol. 124, pp. 518-523, Sep. 2002.

* cited by examiner

*Primary Examiner* — Sang Kim
(74) *Attorney, Agent, or Firm* — Tarolli, Sundheim, Covell & Tummino LLP

(57) ABSTRACT

A belt retractor (10) for a seat belt comprising a belt reel (20), a belt tensioner (44) adapted to drive the belt reel (20) in a winding direction and an extension limiter (16) adapted to restrict the number of revolutions of the belt reel (20) in an unwinding direction in the activated state. The extension limiter (16) is communicated with the belt tensioner (44) so that the extension limiter (16) can only be activated after the belt tensioner (44) has been activated.

21 Claims, 12 Drawing Sheets

State of the Art

State of the Art

BELT RETRACTOR FOR A SEAT-BELT

RELATED APPLICATIONS

This application corresponds to PCT/EP2013/002869, filed Sep. 25, 2013, which claims the benefit of German Application No. 10 2012 019 004.2, filed Sep. 27, 2012, the subject matter of which are incorporated herein by reference in their entirety.

BACKGROUND OF THE INVENTION

The invention relates to a seat belt retractor comprising an extension limiter.

Belt refractors for a seat belt are generally known. Typically they include a force limiter which, in the case of restraint, releases a defined length of webbing despite the belt reel being blocked per se so as to limit the forces acting on a vehicle occupant. The force limiter can be in the form of a torsion rod, for example, which enables the belt reel to continue rotating to a certain extent despite unilateral blocking. This reduces the risk of injury of a vehicle occupant, as in the case of a belt retractor without force limiter high forces can act on the chest of a vehicle occupant, for example, in the event of crash.

However, if is desirable in general to limit the webbing extension to a predetermined degree so that, on the one hand, the forward movement of the occupant especially on the backseats is limited to a defined extent and, on the other hand, the complete safety system of a vehicle can be optimally exploited especially with an air bag. For this purpose, in prior art usually extension limiters are employed which are functionally arranged between the belt reel and the frame. The extension limiter is independent of the force limiter and is activated by an activating mechanism as soon as deceleration loads are occurring in the case of which the force limiter reacts. The extension limiter is activated via a relative rotation between a locking member and the belt reel, wherein a thread mechanism allowing a defined screwing motion of the thread mechanism and locking further extension after passing the maximum admissible revolutions is activated by the relative rotation. The thread mechanism typically consists of two parts, for example two rings one of which has an external toothing and the other has an internal toothing. One part is rotationally fixed relative to the frame, and the other part is connected to be rotationally fixed to the belt reel. Since the force limiter allows twisting of the belt reel despite of a unilateral blocking of the belt reel, also the one part of the thread mechanism is rotating. This entails relative rotation of both parts, causing one part to move along the thread pitch. The allowed extension of the webbing permitted by the extension limiter is defined by a number of revolutions of the two parts relative to each other. After the afore-defined maximally allowed revolutions further extension of the webbing is blocked. In this way, the belt reel is blocked completely, i.e. on both sides of the belt reel, and no further extension via the force limiter is possible.

It has turned out to be a drawback in the belt retractors known from the state of the art that the extension limiters can be activated irrespective of the magnitude of the load in the case of restraint. The introduced load frequently is not so high that the extension limiter has to exercise its function limiting the extension of the webbing. Rather, the force limiter requires only a fraction of the distance made available by the extension limiter. This means that the thread mechanism of the extension limiter has performed e.g. only one of its four revolutions associated until limitation. This entails the fact that in a later case of restraint exhibiting definitely higher loads than the first one the extension limiter reacts earlier as the associated revolutions of the extension limiter were partly performed by the first trigger case. In the example then only three revolutions instead of the provided four revolutions would be available, as already one revolution was performed by the first restraining case at low load. Thus, in the second trigger case the limitation of the extension limiter takes effect earlier than provided.

SUMMARY OF THE INVENTION

Therefore it is the object of the invention to provide a belt retractor comprising an extension limiter which is activated in response to the severity of the case of restraint.

For achieving this object, according to the invention a belt retractor for a seat belt is provided comprising a belt reel, a belt tensioner adapted to drive the belt reel in a winding direction and an extension limiter adapted to limit the number of revolutions of the belt reel in an unwinding direction in the activated condition, wherein the extension limiter is communicated with the belt tensioner so that the extension limiter can only be activated after the belt tensioner has been activated.

It is the baste idea of this invention that for activating the extension limiter the intelligence of the complex activation system of the belt tensioner is used. When the activation system detects that the belt tensioner is to be triggered, it is a fact with sufficient certainty that a case of restraint with considerable risk potential for the occupant is concerned. In this way the extension limiter is only activated when it also has to exercise its function limiting the belt extension, causing unnecessary activations to be prevented. On the other hand, in weaker cases of restraint in which the belt tensioner is not activated it is ensured that also the extension limiter remains deactivated.

In accordance with an especially preferred embodiment, the extension limiter includes a stop catch as well as a retaining member adjustable between a retaining position in which the stop catch is held in a deactivated position and a release position in which the stop catch is released. This provides a mechanical activating mechanism which is extremely reliable. The stop catch is stable and moreover the mechanism connected thereto has a compactor design than in the case of an extension limiter including a brake, for example.

In particular a spring is provided which loads the stop catch from the deactivated position to an engaging position. Accordingly, the stop catch is biased so that no active driving of the stop catch is provided, thereby the reliability of the belt retractor and the extension limiter, resp., being further increased.

The extension limiter especially includes a limiting ring arranged to be twistable to a restricted extent and adapted to be engaged by the stop catch. Thus the extension limiter is limited to a maximum number of revolutions of the limiting ring. The number of revolutions defines a predetermined unwinding length of the webbing which is maximally permitted by the extension limiter. The revolutions of the limiting ring do not start before the stop catch engages in the limiting ring and the toothing thereof, respectively.

Preferably a switch element which is adjusted upon activation of the belt tensioner is provided. Adjusting the switch element by activating the belt tensioner offers a simple mechanical solution for activating the extension limiter. In this context, part of the switch element may be coupled to the retaining member releasing the step catch.

Especially the switch element is spring-loaded and can be adjusted from a home position in which the extension limiter is deactivated to a release position in which the extension limiter is activated. Hence the reliability of the system is further increased, as the switch element is biased so that it need not be actively driven. The mechanical spring loading of the switch element provides a simple as well as safe system.

In accordance with an embodiment, the switch element is a pin which is movably supported in the belt reel. The configuration as a pin is of advantage, as such pin can be manufactured easily and inexpensively. Moreover, the support in the massive belt reel is especially preferred to protect the switch element. Furthermore the pin assists the compact design, because the belt tensioner and the extension limiter can be arranged on opposite sides of the belt retractor and the belt reel is bridged by the pin.

Preferably, in the home position the pin is supported on a force transmission element of the belt tensioner. This is of particular advantage as the pin acting as switch element is disposed directly on a force-introducing element of the belt tensioner. Thus the activation of the belt tensioner can be immediately detected by the pin.

Especially the force transmission element includes a force transmission wheel and a switch wheel which can be twisted relative to each other. The switch element is adjacent to the switch wheel. The force transmission wheel transmits the forces introduced to the force transmission element to the belt reel. Hence the force transmission element is functionally configured by two base members each having its own function. The switch wheel and the force transmission wheel usually rotate synchronously. The rotation of the switch wheel relative to the force transmission wheel is effectuated by activation of the belt tensioner.

The switch wheel is preferably provided with recesses, wherein the switch element can immerse in one of the recesses. By immersion of the switch element in the of the switch wheel the switch element shifts, when a relative rotation between the switch wheal and the force transmission wheel occurs. By immersion and shifting of the switch element the extension limiter can be activated. As long as no relative rotation between the switch wheel and the force transmission wheel takes place, the recesses of the switch wheel ere blocked by the force transmission wheel.

In an especially preferred embodiment the switch wheel is loaded by the belt tensioner. This ensures that the switch element immerses in the recesses of the switch wheel only when the belt tensioner is triggered and loads the switch wheel. When loaded by the belt tensioner, the switch wheel is rotated relative to the force transmission wheel, causing the recesses into which the switch element can immerse to be released.

According to a further embodiment, the force transmission wheel is loaded by the belt tensioner. In this embodiment the force transmission wheal thus has to be considered the trigger element of the extension limiter. The force transmission wheel interacts with the belt tensioner and is loaded by the same, resp., so that the force transmission wheel rotates relative to the switch wheel. In this way the recesses are released and the switch element can enter into the same so that it is caused to switch.

According to a further embodiment, the belt tensioner includes at least one push element which is adjusted upon release of the belt tensioner so as to drive the belt reel in the winding direction, and the switch element is adjusted by the push element. Thus the switch element shifting the extension limiter is mechanically coupled to an element of the belt tensioner, the push element in this case. Accordingly, the extension limiter is activated only upon activation of the belt tensioner, the activation being effectuated via the switch element and the push element. Hence the switch element is automatically shifted upon activation of the belt tensioner.

In an especially preferred embodiment the switch element is a lever which can be adjusted from a home position in which the extension limiter is deactivated to a release position in which the extension limiter is activated. The design of the switch element as lever is especially advantageous, as the lever and thus also the activating mechanism can be manufactured at low cost. The lever can be adjusted by the push element in a simple manner.

Preferably the switch element is supported on the frame of the belt retractor. In this way the switch element is supported on a massively configured part of the belt retractor ensuring that the switch element is reliably supported and is functional in the case of need.

Especially, the switch element can be pivoted about an axis extending in parallel to the central axis of the belt reel. This can facilitate the space-saving structure of the belt retractor, as functional elements on both sides of the belt retractor are coupled by the switch element.

In accordance with an especially preferred embodiment a retaining member is provided which is rotatably supported on the belt reel, wherein the retaining member is held to be detachable in a holding position by a locking device. According to this embodiment, the retaining member holding the stop catch is held in turn via a further element, viz, the locking device, so that it can follow the rotational movement of the belt reel.

Preferably, the retaining member is an inertia element which is rotatably mounted on the belt reel. Due to its inertia, the retaining member can no longer follow the rotational movement of the belt reel from a particular acceleration of the belt reel which is lower than the acceleration applied to the belt reel by the belt tensioner. Thus a passive retaining member merely depending on the acceleration of the belt reel is provided.

Especially the locking device is a locking tab the locking effect of which is overcome when a predetermined torque acts between the retaining member and the belt reel. The locking tab looks the stop catch up to a certain torque. From a particular rotational acceleration of the belt reel the retaining member detaches and releases the stop catch. In this way the extension limiter is activated only from a predetermined acceleration, wherein this acceleration is lower than that exerted by the belt tensioner on the belt reel.

Preferably the locking device can retain the retaining member in a release position. This ensures that the retaining member does not detach during rotational movement at low acceleration and thus the stop catch remains in the release position. The extension limiter thus continues being deactivated during rotational movements at low acceleration.

According to a further embodiment an actor for the stop catch is provided which is triggered by the signal of the belt tensioner. Thus an extension limiter is provided which is actively activated via an actor, especially via an actuator. Activation takes place in response to the activation of the belt tensioner, as the same signal can be used.

BRIEF DESCRIPTION OF THE DRAWINGS

Hereinafter the invention will be described by way of different embodiments which are illustrated in the enclosed drawings, in which:

FIG. 18a shows an extension limiter side of the belt retractor of the third embodiment wherein some elements are not illustrated for the purpose of clarity.

DESCRIPTION

Figure 1:
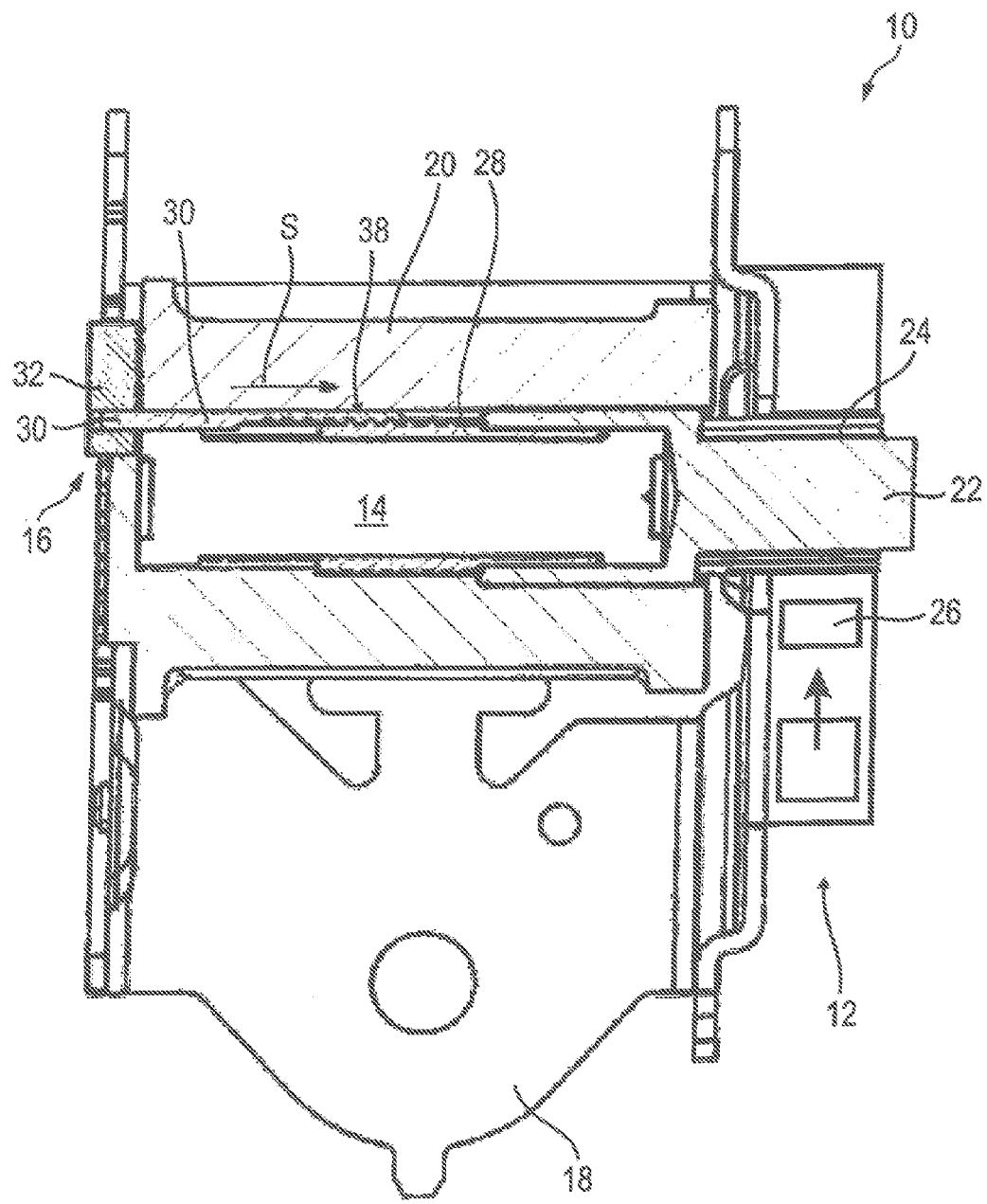
FIG. 1 shows a section of a belt retractor comprising an extension limiter of the state of the art.
Figure 2:
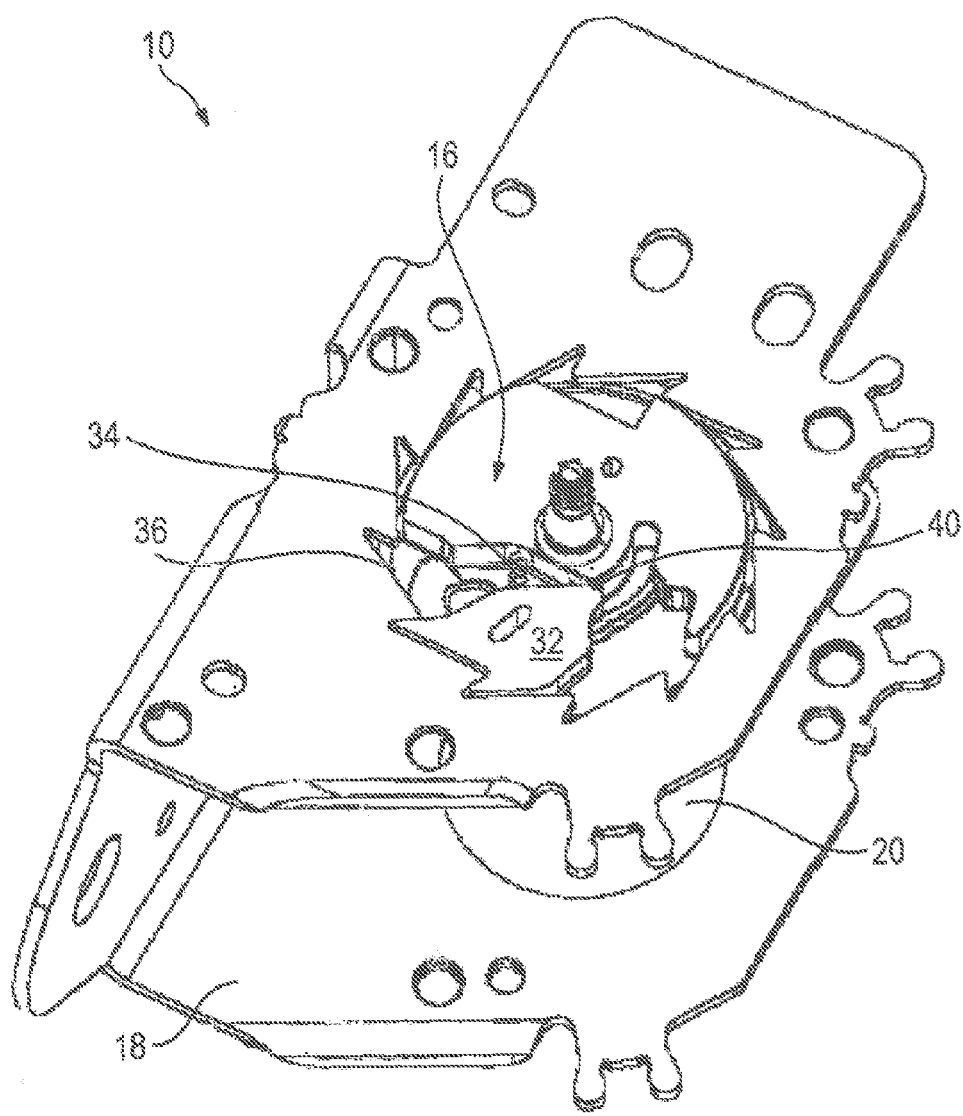
FIG. 2 shows a perspective view of the belt retractor from FIG. 1.

By way of FIGS. 1 and 2 in which a state-of-the-art belt retractor 10 is shown, first the functioning of a belt retractor 10 comprising a locking mechanism 12, a force limiter 14 and an extension limiter 16 is illustrated in general.

The belt retractor 10 includes a frame 18 and a belt reel 20 onto which a webbing of a seat belt not shown here can be wound. On its right side (related to FIG. 1) the belt reel 20 is provided with a locking member 22 which moreover is part of the locking mechanism 12. The locking member 22 has stop teeth 24 which can be engaged by a blocking latch 26 in a case of restraint, causing the locking mechanism 12 of the belt retractor 10 to be activated and to lock the belt reel 20 on one side so as to prevent further extension of the webbing. The locking mechanism 12 can be triggered in the known way either in a vehicle-sensitive or in a webbing-sensitive manner.

Inside the belt reel 20 the force limiter 14 is arranged in the form of a torsion rod connected with its right end (related to FIG. 1) to the locking member 22 in a rotationally fixed manner. The other end of the force limiter 14 is connected to be rotationally fixed to the belt reel 20. Thus the belt reel 20 can continue rotating by twisting the force limiter 14 in itself while the locking mechanism 12 is otherwise activated, when the torque acting on the force limiter 14 is higher than the resistance moment of the force limiter 14. The locking mechanism 12 thus locks the belt reel 20 only on the right side of the belt retractor 10, the force limiter 14 permitting rotation of the belt reel 20 to a certain extent in the case of high decelerating loads so as to limit the forces acting on the vehicle occupant.

On the left side of the belt retractor 10 (related to FIG. 1) the extension limiter 16 is arranged. The activating mechanism of the extension limiter 16 includes a threaded switch element 28 which interacts with a retaining member 30 via a thread mechanism 38 serving for activation of the extension limiter 16. The retaining member 30 retains a stop catch 32 supported on the belt reel 20 (cf. especially FIG. 2) at a home position. The stop catch 32 is loaded via a spring 34 in the form of a compression spring so that upon release the stop catch 32 is driven into a teeth portion 36 of the frame 18 and blocks rotation of the belt reel 20. Thus the extension limiter 16 is activated, whereby the belt reel 20 is locked completely, i.e. on both sides of the belt retractor 10, and also the force limiter 14 allows no further webbing extension.

In the state of the art the extension limiter 16 is activated as follows:

The switch element 28 and the retaining member 30 are fixedly connected to the locking member 22 and the belt reel 20, respectively. Moreover, the retaining member 30 is coupled to the switch element 28 via the thread or teeth mechanism 38 (cf. FIG. 1) so that the retaining member 30 can move along the arrow S during rotation of the belt reel 20 relative to the locking member 22. The switch element 28 including the retaining member 30 arranged on the same retains the stop catch 32 in its home position in the normal case. The term "normal case" means that the locking mechanism 12 is not activated and the belt reel 20 can rotate unhindered, because neither is the blocking latch 26 engaged in the stop teeth 24 nor is the stop catch 32 engaged in the teeth portion 36 of the frame 18.

When the locking mechanism 12 reacts in a vehicle-sensitive or webbing-sensitive manner, the blocking latch 26 is driven into the stop teeth 24, causing the locking member 22 to be held in a rotationally fixed manner. The belt reel 20 is thus locked on one side and rotationally fixed as long as the torque acting on the belt reel 20 is lower than the torque adapted to be transmitted by the force limiter 14. When this torque is exceeded, however, due to the forces acting on the webbing, the force limiter 14 yields and twists, resp., causing the belt reel 20 to rotate relative to the locking member 22. Due to the relative rotation, the retaining member 30 screws via the thread mechanism 38 in the direction of arrow S into the belt reel 20, thus the retaining member 30 being disengaged from the stop catch 32 and the latter being released. The stop catch 32 then swivels about a bearing point 40 into the teeth portion 38 of the frame 18 due to the spring 34, thereby the extension limiter 16 preventing further webbing extension.

The permitted extension length by the extension limiter 16 is defined by the revolutions of the retaining member 30 relative to the switch element 28 of the thread or teeth mechanism 38, wherein the configuration of the retaining member 30 plays an additional role. Finally the permitted extension length is defined by the number of revolutions of the thread and teeth mechanism 38 until the retaining member 30 is disengaged from the stop catch 32 and thereby releases the latter.

When the locking mechanism 12 is activated and the force limiter 14 twists for a short time, it follows that the retaining member 30 moves only by a partial distance to the switch element 28 along the thread mechanism 38. Thus the extension limiter 16 has been pre-activated, but it has covered only a partial distance of the actually available distance. In a later case of restraint the extension limiter 16 would prevent the webbing extension earlier than scheduled, as the complete thread pitch of the thread mechanism 38 is no longer provided.

As is resulting from FIGS. 1 and 2, in prior art the extension limiter 16 is pre-activated as soon as the force limiter 14 reacts. This can be the case already in minor cases of restraint, i.e. for example with slight fender benders.

As an alternative to the thread mechanism 38 inside the belt reel 20, it is also possible to provide the thread or teeth mechanism 38 by a thread ring and a counter ring, the thread ring having internal teeth and an external thread. In such embodiment the stop catch 32 is driven into the internal teeth of the thread ring after release by the retaining member 30 and couples the thread ring to the rotary motion of the belt reel 20, causing the thread ring to rotate with its external thread into an internal thread of the counter ring. The counter ring is fixedly supported on the frame 18. Twisting the thread ring into the counter ring is possible until the thread ring reaches a stop and no further rotary motion of the belt reel 20 is possible. Thus the maximum permitted webbing extension is fixed by rotating the thread ring relative to the counter ring analogously to the thread or teeth mechanism 38 from FIGS. 1 and 2.

Figure 3:
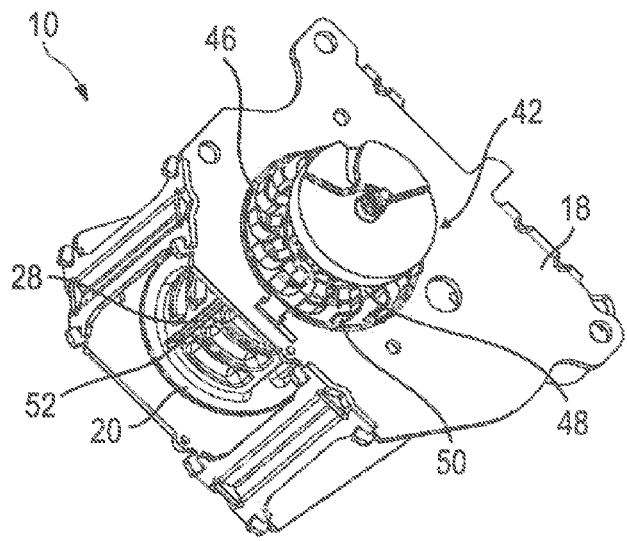
FIG. 3 shows a perspective view of a belt retractor according to the invention in accordance with a first embodiment.

FIG. 3 shows a belt retractor 10 of the invention in accordance with a first embodiment. The extension limiter 16 includes an activating mechanism which is triggered in response to a belt tensioner not shown here. For the components known from FIGS. 1 and 2 the same reference numerals are used and in this respect reference is made to the foregoing explanations.

The belt retractor 10 includes a frame 18 and a belt reel 20. Around the belt reel 20 webbing not shown here is wound which fixes a vehicle occupant in a case of restraint. The extension limiter 16 is not visible in this Figure, as it is arranged on the opposite side of the belt retractor 10.

Figure 4:
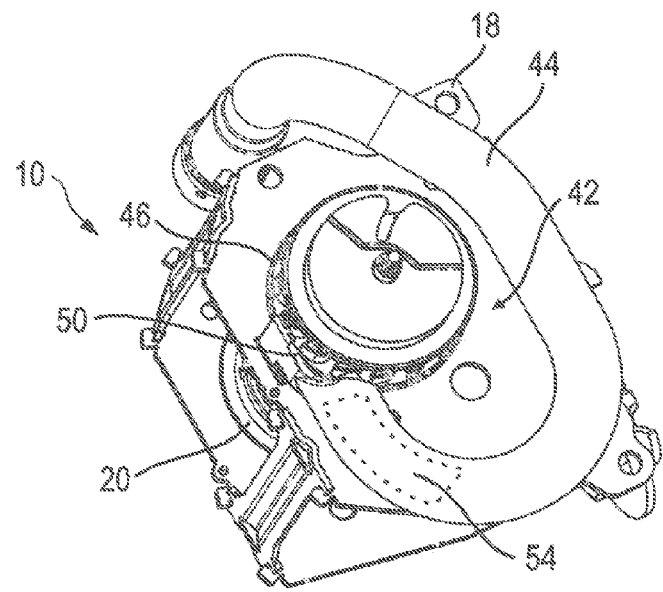
FIG. 4 shows a perspective view of the belt retractor from FIG. 3 including a belt tensioner.

On this side of the belt retractor 10 a force transmission element 42 is arranged which interacts with a belt tensioner 44 (cf. FIG. 4). The force transmission element 42 includes a switch wheel 46 as well as a force transmission wheel 48, wherein "L-shaped" action elements 50 are provided on the switch wheel 46. The switch wheel 46 and the force transmission wheel 48 are supported on an axis to be rotatable relative to each other, but in the normal case they rotate synchronously. The "L-shaped" action elements 50 serve as action points for the belt tensioner 44 so as to drive the belt reel 20 in the winding direction.

The belt reel 20 supported inside the frame 18 moreover includes a recess for the switch element 28 which is biased by a spring element 52 and is loaded against the force transmission element 42. The switch element 28 is movably supported in the belt reel 20 and is indirectly switched by the belt tensioner 44 and thus indirectly activates the extension limiter 16 on the opposite side of the belt retractor 10. The exact functioning and, resp., the shifting of the switch element 28 is illustrated in detail by way of FIGS. 5 to 8.

FIG. 4 initially shows the belt retractor 10 from FIG. 3 including the belt tensioner 44 arranged thereon. A gas generator not shown here is arranged on the one end and upon activation of the belt tensioner 44 loads a schematically represented push element 64 acting on the force transmission element 42 and, resp., on the "L-shaped" action elements 50 of the switch wheel 46 causing the switch element 28 to shift.

Figure 5:
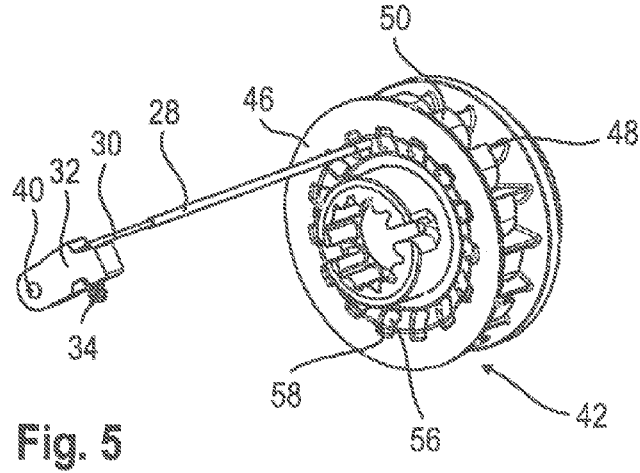
FIG. 5 shows a perspective view of several functional elements of an activating mechanism of an extension limiter of the belt retractor.

FIG. 5 shows the substantial functional elements required for the shifting of the switch element 28 and for the activation of the extension limiter 16. The force transmission element 42 is shown which includes the force transmission wheel 48 as well as the switch wheel 46 having the "L-shaped" action elements 50. In addition, recesses 56 provided at the switch wheel 46 are visible. In the shown representation corresponding to the non-shifted state of the switch element 28, the recesses 56 are blocked by the force transmission wheel 48. At the left and (related to FIG. 5) of the switch element 28 the retaining member 30 is arranged which holds the stop catch 32 against the spring pressure of the spring 34 in the release position.

In the normal case, i.e. during normal vehicle operation and involved winding and unwinding of the seat belt for buckling and unbuckling, the force transmission element 42 synchronously rotates with the belt reel 20 without relative rotation. Hence the contact position of the switch element 28 on the switch wheel 46 is the same, as the switch element 28 rotates with the belt reel 20 which rotates synchronously with the switch wheel 46 and the force transmission wheel 48.

In a case of restraint, the locking mechanism 12 would be triggered so as to fix the vehicle occupant via the webbing. Depending on the severity of the case of restraint, forces may occur which are so high that the force limiter 14 slightly twists. The belt reel 20 would slightly rotate vis-à-vis the force transmission element 42 due to the force limiter 14 which is arranged on the side of the belt reel 20 fixed by the activated locking mechanism 12. The switch element 28 accordingly would arrive at but not immerse into one of the recesses 56, as the recesses 56 continue being blocked by the force transmission wheel 48. Thus the extension limiter 16 has not been activated despite the force limiter 14 being active. In addition, ramps 58 are provided at the recesses 56 causing the switch element 28 net to get stuck at an edge of the recesses 56.

FIGS. 6 to 8 illustrate the event that the restraint case is so strong that the belt tensioner 44 is triggered and thus shifts the switch element 28.

Figure 6A:
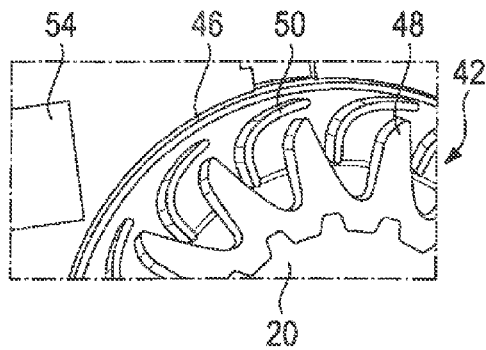
FIG. 6a shows a tensioner side of the belt retractor comprising an activated extension limiter.

FIG. 6a shows the belt tensioner side of the bolt retractor 10 on which the force transmission element 42 is arranged. In the shown situation the belt tensioner 44 has been triggered and the push element 54 is loaded by the belt tensioner 44 so as to act on the force transmission element 42 such that the belt reel 20 is rotated in the winding direction.

Figure 6B:
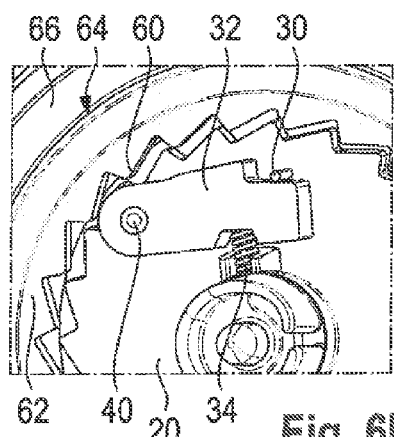
FIG. 6b shows an extension limiter side of the belt retractor comprising a non-activated extension limiter.

FIG. 6b illustrates the extension limiter side of the belt retractor 10 at the same time. Since the extension limiter 16 has not yet been activated, the stop catch 32 is held by the retaining member 30 in the release position against the pressure of the spring 34. The stop catch 32 thus cannot pivot about the bearing point 40 and remains disengaged from teeth 60 of a limiting ring 62.

Figure 7A:
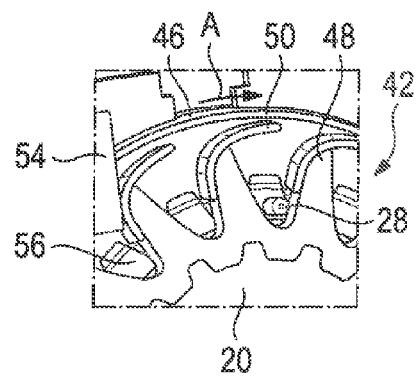
FIG. 7a shows a tensioner side of the belt retractor comprising an activated extension limiter.

In FIG. 7a the belt retractor 10 from FIG. 6a is shown at a later time, as the push element 54 has loaded the "L-shaped" action elements 50 of the switch wheel 46 and thus has rotated the switch wheel 46 relative to the force transmission wheel 48. Due to the rotation of the switch wheel 46 relative to the force transmission wheel 48, the recesses 56 have been exposed so that the switch element 28 could immerse into one of the recesses 56. This is possible because the switch element 28 is loaded by the spring element 52 and, on the other hand, is movably supported in the belt reel 20. The switch element 28 is thus provided in the shifted state. Moreover, the push element 54 will continue loading the force transmission element 42 causing the belt reel 20 to be rotated in the winding direction A.

Figure 7B:
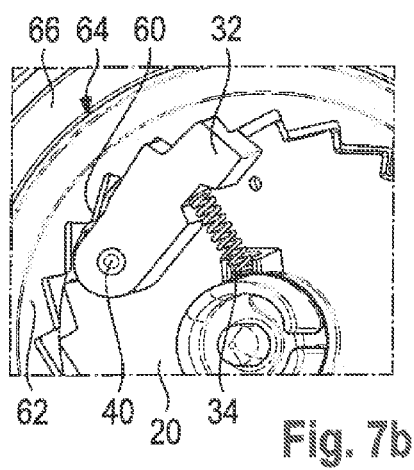
FIG. 7b shows an extension limiter side of the belt retractor comprising an activated extension limiter.

On the extension limiter side of the belt retractor 10 shown in FIG. 7b the retaining member 30 is equally displaced by the shifting of the switch element 28 so that the retaining member 30 releases the stop catch 32. Due to the spring pressure of the spring 34, the stop catch 32 pivots about the bearing point 40 and then engages in the teeth 60 of the limiting ring 62. Thus the extension limiter 16 is activated, i.e. the belt reel 20 and the limiting ring 62 are coupled during rotation of the belt reel in the unwinding direction B. When the belt reel is rotated in the winding direction A, it can rotate relative to the limiting ring due to the locking geometry of the stop catch and the teeth geometry.

Figure 8A:
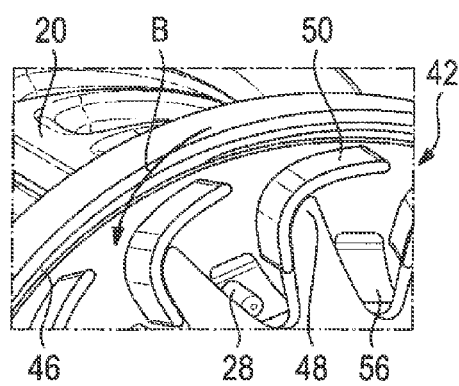
FIG. 8a shows a tensioner side of the belt retractor in the case of restraint.

FIG. 8a illustrates the start of the reverse rotation in the unwinding direction B of the belt reel 20 after completion of tensioning. This is due to the fact that because of the vehicle deceleration after completed belt tensioning the vehicle occupant applies force which allows the belt reel 20 to rotate in the unwinding direction B. The force transmission element 42 remains rotationally fixed, however, due to the activated locking mechanism 12 so that the belt reel 20 can twist due to the torsion of the force limiter 14. The switch element 28 immersed through one of the recesses 56 is shorn at the force transmission wheel 48.

Figure 8B:
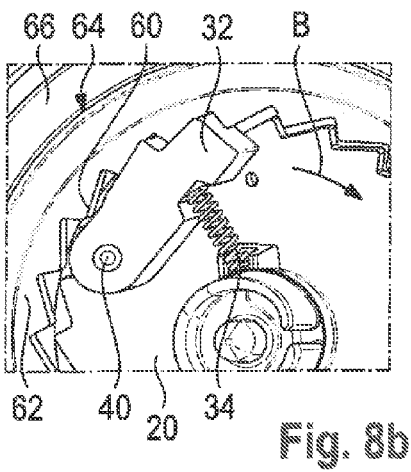
FIG. 8b shows an extension limiter side of the belt retractor in the case of restraint.

It is shown in FIG. 8b that twisting the belt reel 20 in the unwinding direction B entails rotation of the limiting ring 62. The belt reel 20 continues rotating in the unwinding direction B, causing the stop catch 32 co-rotating with the belt reel 20 and being driven into the teeth 60 of the limiting ring 62 to drive the limiting ring 62 in the direction of rotation of the belt reel 20. By virtue of the thread mechanism 64, the limiting ring 62 co-rotating with the belt reel 20 screws along a threaded element 66 to a stop. Upon reaching the stop, the belt reel 20 is prevented from further rotating, thereby the latter being blocked completely, i.e. on both sides of the belt retractor 10, and no further webbing extension being possible any more.

The extension limiter 16 defines its maximum allowed webbing extension length by the thread mechanism 64 of the limiting ring 62 with the threaded element 66. Accordingly, said thread mechanism 64 corresponds to the state-of-the-art teeth or thread mechanism 38 (FIG. 1), as the maximum webbing extension length is defined by the thread mechanism 64. In this embodiment the thread mechanism 64 is arranged on the second side of the belt retractor 10, however, in contrast to the teeth and thread mechanism 38 from FIGS. 1 and 2, where it is arranged in the belt reel 20.

Figure 9:
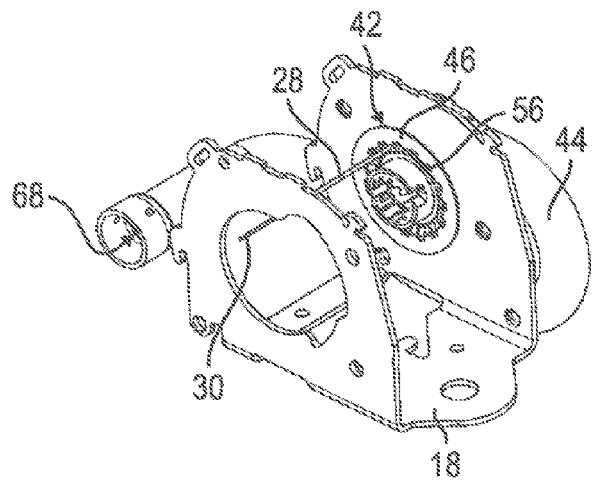
FIG. 9 shows a perspective view of the belt retractor without belt reel.

FIG. 9 illustrates the frame 18 of the belt retractor 10 including the belt tensioner 44, wherein the belt reel 20 and the extension limiter 16 are not shown. The switch element 28 extending along the belt reel 20 not shown here is clearly visible. It is moreover visible that the switch element 28 is supported on the switch wheel 46. In the shown position the switch wheel 46 is provided in a position not activated by the belt tensioner 44 and, resp., the push element 54 of the belt tensioner 44, as the switch element 28 is not immersed in one of the recesses 56. The recesses 56 are blocked by the force transmission wheel 48. From the Figure a seat 68 for a gas generator of the belt tensioner 44 is clearly visible which can apply the pressure generated by the gas generator to the push element 54 (not shown) so as to apply force which drives the belt reel 20 in the winding direction to the force transmission element 42.

Figure 10:
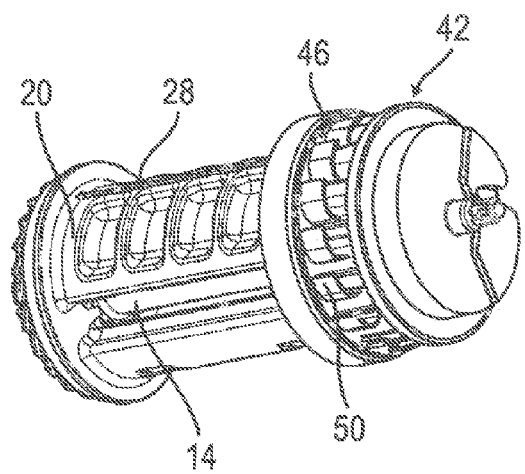
FIG. 10 shows a perspective view of the belt reel comprising a force transmission element.

FIG. 10 shows the belt reel 20 including the force transmission element 42 arranged thereon. The switch wheel 46 including the "L-shaped" action elements 50 is clearly evident just as the force limiter 14 in the form of a torsion rod arranged centrally in the belt reel 20. The switch element 28 shifting the extension limiter 16 is equally evident and extends, just as the force limiter 14, inside the belt reel 20.

Figure 11:
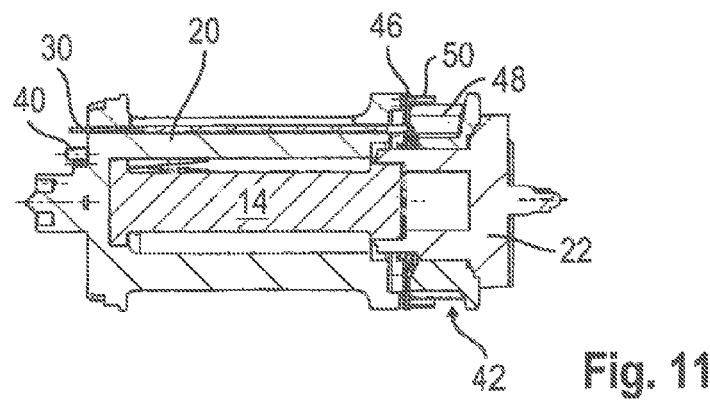
FIG. 11 shows a section across the belt reel from FIG. 10.

FIG. 11 illustrates a section of the belt reel 20 from FIG. 10. The structure of the belt reel 20 including the centrally arranged force limiter 14 is clearly visible in this Figure. Similarly to FIG. 1, on the right side the locking member 22 is arranged which is connected to the force limiter 14 in a rotationally fixed manner. On the left side the force limiter 14 is coupled to be rotationally fixed to the belt reel 20, which enables the belt reel 20 to rotate via the torsion of the force limiter 14 when the locking mechanism 12 including the rotationally fixed locking member 22 is activated.

In addition, the basic structure of the activating mechanism of the extension limiter 16 is evident. The switch element 28 is not shifted, because the retaining member 30 projects on the left side (related to FIG. 11) of the belt reel 20. It is further evident on the right side that the switch element 28 is adjacent to the switch wheel 46. On the left side the bearing point 40 of the stop catch 32 is visible which is in the form of a journal at the belt reel 20.

Figure 12:
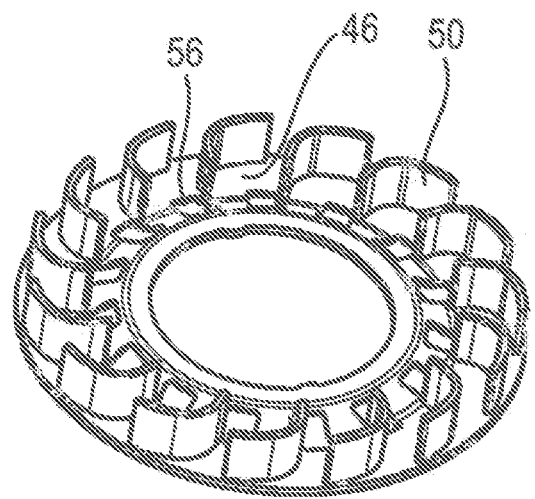
FIG. 12 shows a perspective view of a switch wheel of the extension limiter.

In FIG. 12 the switch wheel 46 of the force transmission element 42 is separately shown with the recesses 56 being clearly visible. Moreover, the "L-shaped" action elements 50 are shown on which the push element 54 of the belt tensioner 44 acts to twist the switch wheel 46 relative to the force transmission wheel 48 causing the recesses 56 to be exposed and the switch element 28 to shift.

Figure 13:
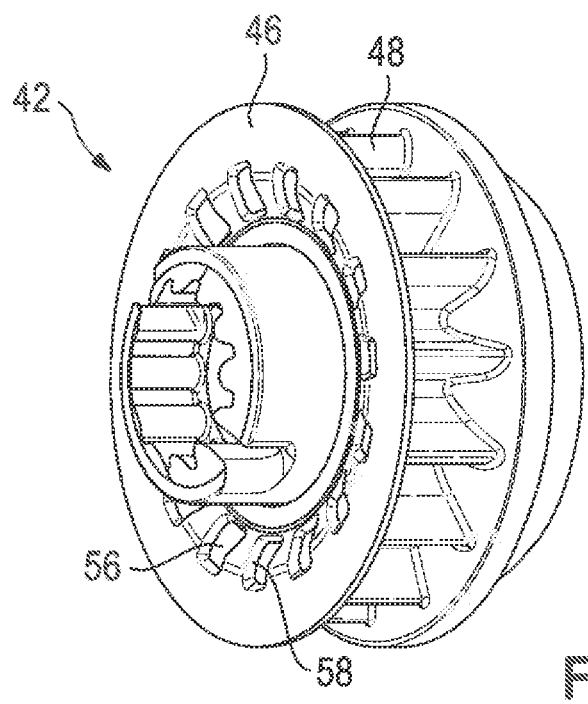
FIG. 13 shows a perspective view of a force transmission element according to a second embodiment of the belt retractor.

FIG. 13 illustrates the force transmission element 42 for a belt retractor 10 according to a second embodiment, wherein the force transmission wheel 48 is configured like a turbine. In this embodiment, the belt tensioner 44 acts directly on the force transmission wheel 48 causing the latter to be rotated relative to the switch wheel 46 upon activation of the belt tensioner 44 and thus the recesses 56 to be exposed. The further course of activation is analogous to the first embodiment. Merely, instead of the switch wheel 46 the force transmission wheel 48 is loaded by the belt tensioner 44.

Figure 14:
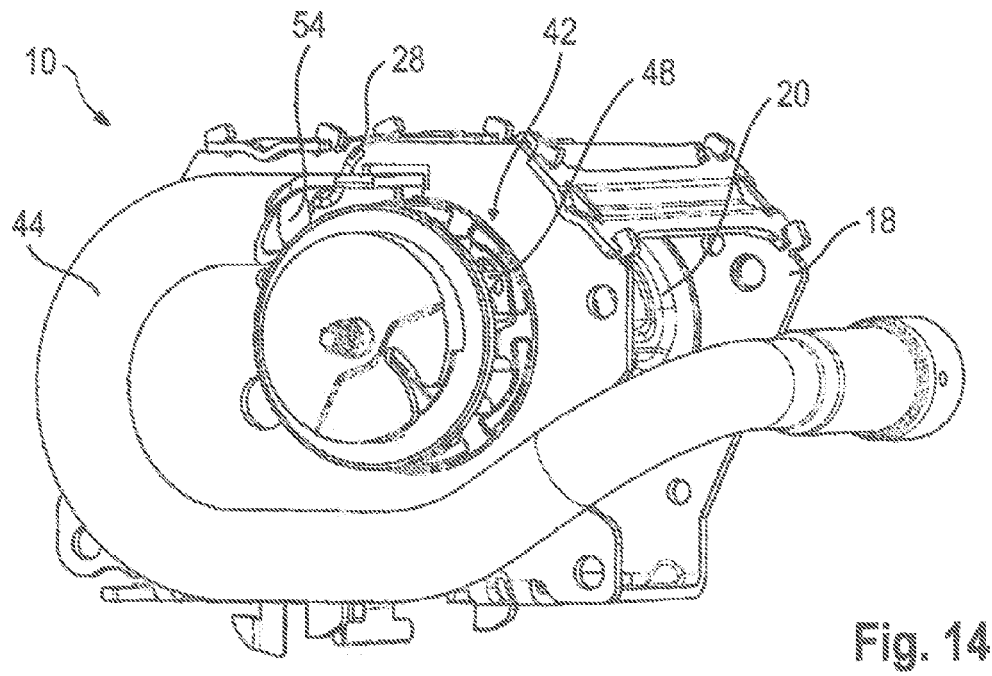
FIG. 14 shows a perspective view of a belt retractor according to a third embodiment.

FIG. 14 shows a third embodiment of the belt retractor 10 according to the invention, wherein the same reference numerals are used for features which are known from the preceding Figures.

Analogously to the first embodiment, this embodiment of the belt retractor 10 equally exhibits the frame 18, the belt reel 20, the extension limiter 16 and the force transmission element 42 which is loaded by the belt tensioner 44.

In addition, the switch element 28 is provided, wherein it is in the form of a lever in this embodiment causing the activating mechanism of the extension limiter 16 to be slightly varied vis-à-vis the first two embodiments.

The switch element 28 is disposed between the force transmission element 42 which only consists of the force transmission wheel 48 in this embodiment and the belt tensioner 44.

Upon activation of the belt tensioner 44, the push element 54 interacts with the force transmission element 42 so that the belt reel 20 is rotated in the winding direction to tighten the webbing and to fix the vehicle occupant at the seat. This takes place analogously to the first embodiment.

However, in this embodiment the push element 54 first contacts the switch element 28 in the form of a lever, thus causing the switch element 28 to be adjusted. By activating the belt tensioner 44 the switch element 28 is thus moved from an inactive position to an active position.

Figure 15:
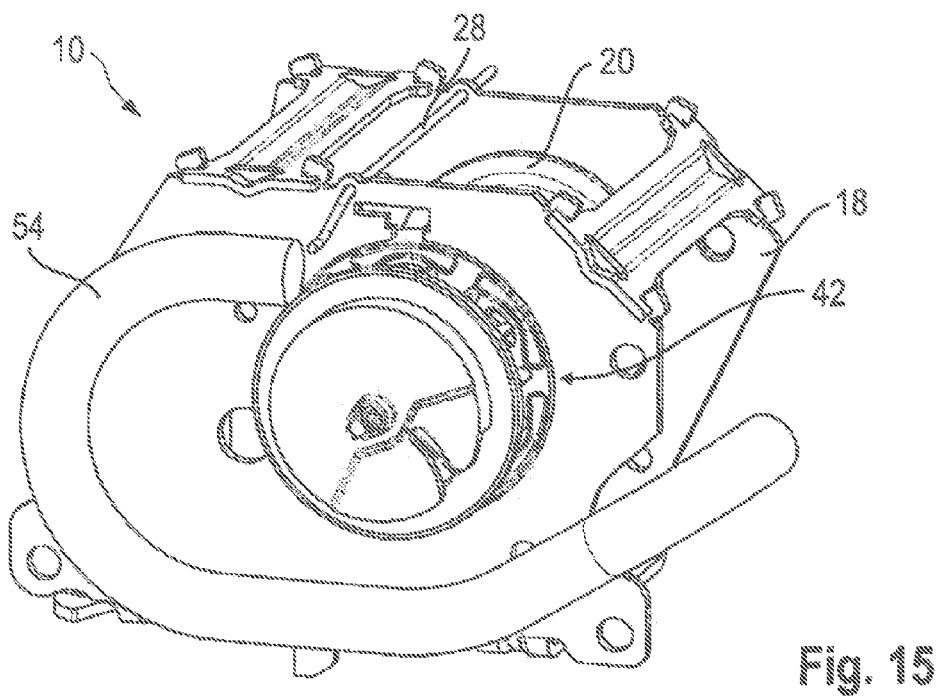
FIG. 15 shows a different perspective view of the belt retractor according to FIG. 14 without belt tensioner.

FIG. 15 illustrates the belt retractor 10 according to the third embodiment viewed from a different perspective which better presents the switch element 28. Furthermore, in this Figure the belt tensioner 44 is not shown so that the push element 54 is exposed. It can be inferred from the Figure that the switch element 28 extends along the belt reel 20 and is supported on the frame 18. Consequently, the switch element 28 loaded by the push element 54 is swiveled about an axis extending in parallel to the central axis of the belt reel 20 and the extension limiter 16 is activated on the opposite side.

The swiveling of the switch element 28 by the push element 54 indirectly causes the release of the stop catch 32, thereby the extension limiter 16 being activated. This is shown in FIGS. 17 to 19.

Figure 16A:
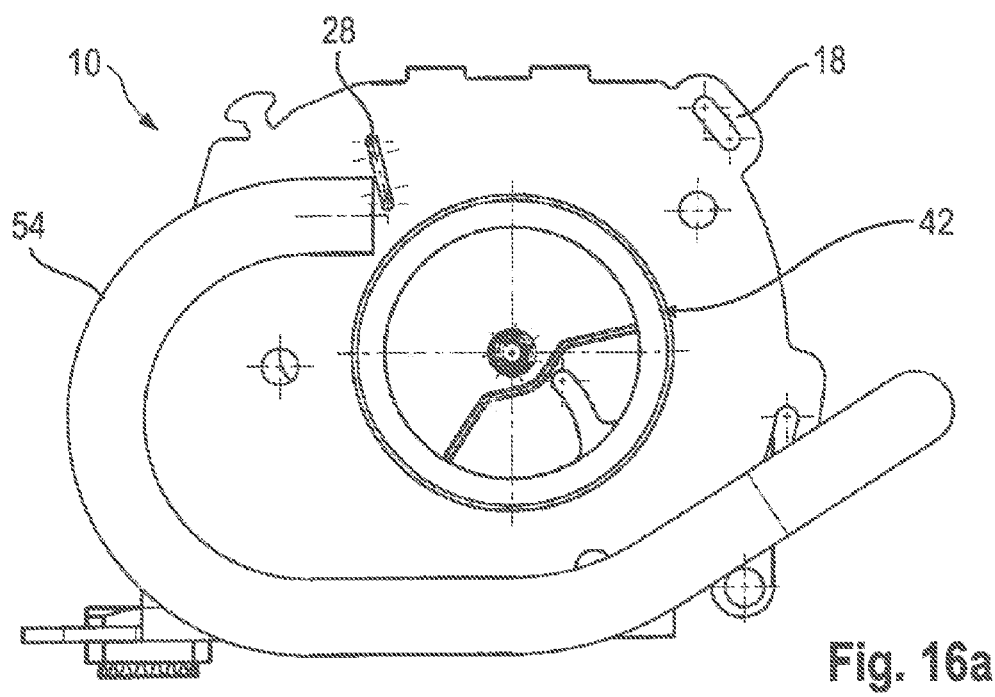
FIG. 16a shows a tensioner side of the belt retractor of the third embodiment with non-shifted switch element.

FIG. 16*a* shows the belt tensioner side of the belt retractor 10 according to the third embodiment. The extension limiter 16 is not activated in the shown representation, as the switch element 28 is not yet swiveled and shifted by the push element 54. However, the push element 54 has been activated by the belt tensioner 44 and is just about to swivel and thus shift the switch element 28.

Figure 16B:
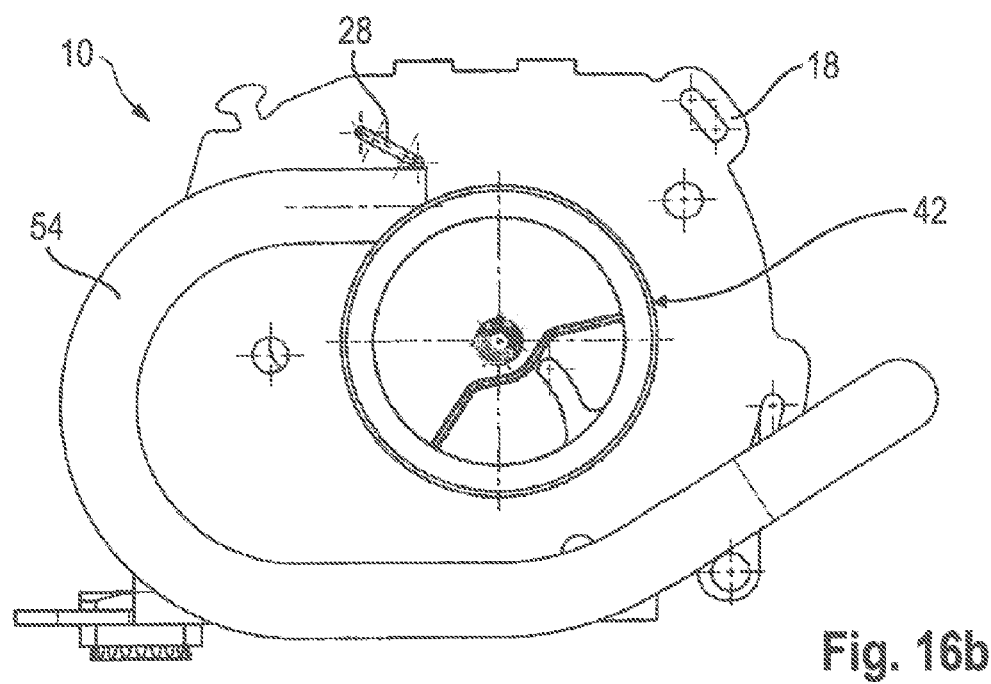
FIG. 16b shows a tensioner side of the belt retractor of the third embodiment with shifted switch element.

In FIG. 16*b* the belt retractor 10 is shown with the switch element 28 being shifted, because the latter has been swiveled by the push element 54. By swiveling the switch element 28 the extension limiter 16 has been activated on the extension limiter side of the belt retractor 10 which is shown in FIGS. 17 to 19. The push element 54 driven by the belt tensioner 44 is already engaged in the force transmission element 42 in the representation shown here, causing the tightening function of the belt tensioner 44 to be performed.

Thus the belt reel 20 is driven by the push element 54 against the extension direction so as to tighten the belt.

In FIGS. 17 to 19 the extension limiter side of the belt retractor 10 according to the third embodiment is shown. The activation of the extension limiter 16 is illustrated by way of these Figures.

Figure 17A:
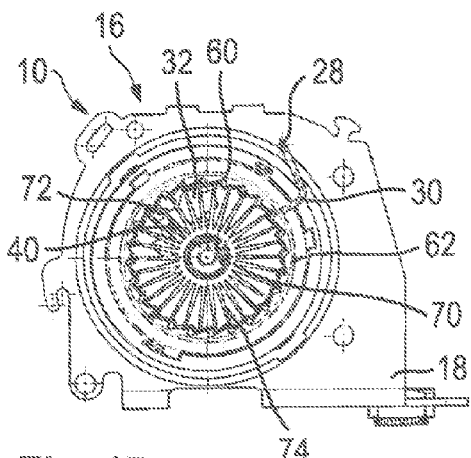
FIG. 17a shows an extension limiter side of the belt retractor of the third embodiment.
Figure 18:
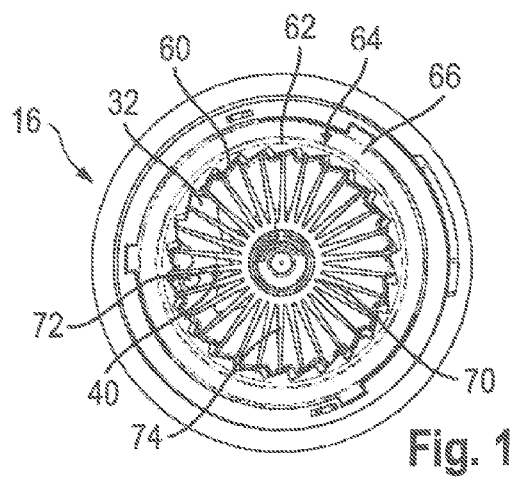
FIG. 18 shows an extension limiter side of the belt retractor of the third embodiment with activated extension limiter, wherein some elements are not illustrated for the purpose of clarity.

FIG. 17*a* shows the other end of the switch element 28 whose end is in the form of a hook-shaped retaining member 30 interacting with a locking disk 70 so as to activate the extension limiter 16. In the normal case the locking disk 70 co-rotates with the belt reel 20, wherein the locking disk 70 is basically arranged to be rotatable relative to the belt reel 20, however.

The locking disk 70 acts on the stop catch 32 via a cam 72. The cam 72 is arranged on the stop catch 32 and is clamped between spoke elements 74 of the locking disk 70. This entails a mechanical connection between the locking disk 70 and the stop catch 32 via the cam 72 so that forces can be transmitted to the stop catch 32. The stop catch 32 is adapted to be swiveled about the bearing point 40 so as to engage in the teeth 60 of the limiting ring 62 and to activate the extension limiter 16.

In the shown representation the switch element 28 is in the non-shifted state as the retaining member 30 is not engaged in the locking disk 70.

Figure 17B:
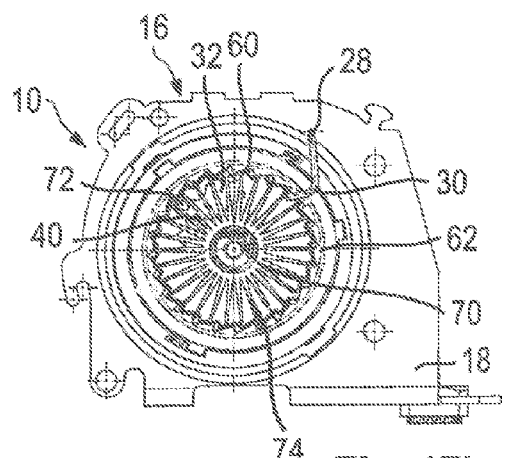
FIG. 17b shows an extension limiter side of the belt retractor of the third embodiment.

FIG. 17*b* illustrates the switch element 28 in a shifted state, the state shown here corresponding to the state directly after shifting the switch element 28. The retaining member 30 is adjacent to the locking disk 70 causing a twist of the locking disk 70 to be prevented by the retaining member 30. As the retaining member 30 stops further rotation of the locking disk 70, the locking disk 70 twists relative to the rotating belt reel 20 including the stop catch 32 arranged thereon. In this way force is exerted on the cam 72 via the spoke elements 74 of the locking disk 70 which force the cam 72 transmits to the stop catch 32. Since the stop catch 32 is connected to the belt reel 20 via the bearing point 40 and the belt reel 20 rotates, a torque acts on the stop catch 32. The torque applied results in the fact that the stop catch 32 swivels about the bearing point 40 and is driven into the teeth 60, thereby the extension limiter 16 being activated. In the shown representation the stop catch 32 is about to enter into engagement with the teeth 60.

In FIG. 18 the activated extension limiter 16 is shown, as the stop catch 32 now is engaged in the teeth 60 of the limiting ring 62. Thus the extension limiter 16 has been activated by the push element 54, because the latter has adjusted the switch element 28 on the belt tensioner side of the belt retractor 10, thereby the switch element 28 having twisted about an axis in parallel to the belt reel 20. In this way, on the extension limiter side of the belt retractor 10 the retaining member 30 has prevented the locking disk 70 from further rotating with the belt reel 20. A torque which has been transmitted to the cam 72 has acted on the locking disk 70. The cam 72 is communicated with the stop catch 32 and has transmitted the torque to the stop catch 32, as the belt reel 20 rotates with the stop catch 32 arranged thereon. By the torque transmitted to the stop catch 32 the stop catch 32 has engaged in the teeth 60 of the limiting ring 62, because the stop catch 32 has twisted about the bearing point 40. Hence the extension limiter 16 has been activated by the belt tensioner 44.

Figure 19A:
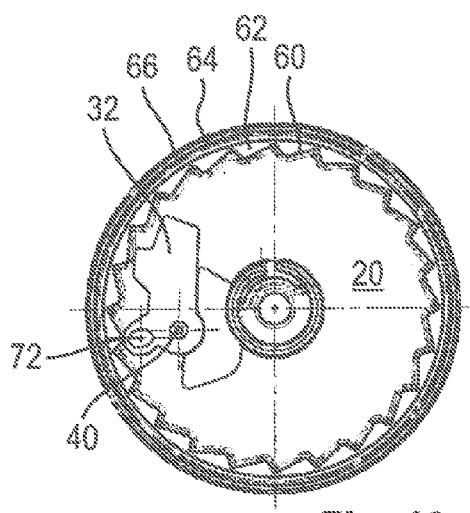
FIG. 19b shows an extension limiter side of the belt retractor of the third embodiment wherein some elements are not illustrated for the purpose of clarity.
Figure 19B:
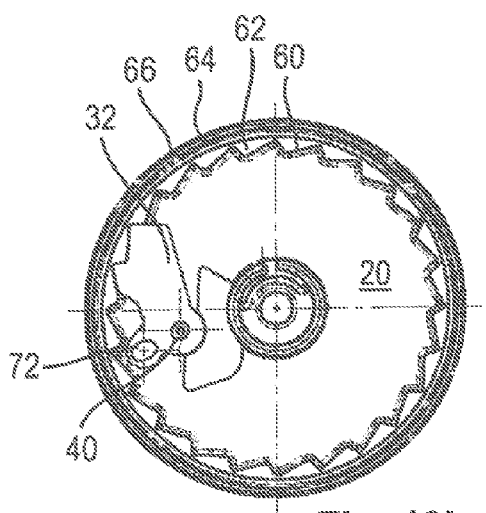

In FIGS. 19*a* and 19*b* the extension limiter side of the belt retractor 10 is shown, wherein several elements are not shown so that the stop catch 32 including the cam 72 arranged thereon is clearly visible. The stop catch 32 is provided in a not shifted state in FIG. 19*a* and in a shifted state in FIG. 19b. It becomes evident from both Figures that the twisting of the earn 72 causes the stop catch 32 to swivel about the bearing point 40, thereby the stop catch 32 engaging in the teeth 60. Thus the extension limiter 16 is activated, because the stop catch 32 couples the limiting ring 62 to the rotation of the belt reel 20 causing the limiting ring to be turned into the threaded element 66 via the thread mechanism 64.

Figure 20A:
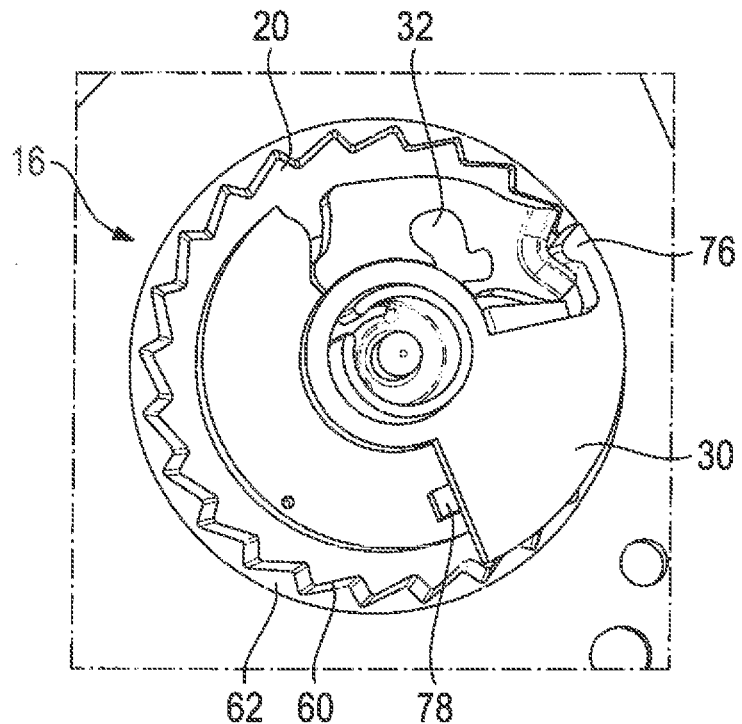
FIG. 20a shows an extension limiter side of the belt retractor according to a fourth embodiment with non-activated extension limiter.

In FIG. 20a the extension limiter side of the belt retractor 10 according to a fourth embodiment is shown, wherein the activating mechanism of the extension limiter 16 includes the retaining member 30, the stop catch 32 and a looking device 76. The locking device 76 is arranged on the retaining member 30, wherein the retaining member 30 is in the form of an inertia element. In the normal case the locking device 76, which is a looking tab, holds the retaining member 30 on the stop catch 32 and fixes the stop catch 32 against the spring force of the spring 34 not visible here. Thus in the normal case the stop catch 32, the locking device 76 and the retaining member 30 can follow the rotation of the belt reel 20. The retaining member 30 is held to be detachable from the locking device 76 by the stop catch 32, the retaining member 30 additionally contacting a contact cam 78 of the belt reel 20. Thus the retaining member 30 is coupled to the movement of the belt reel 20 and the stop catch 32 arranged thereon. The coupling is brought about via a journal 80 of the retaining member 30 (cf. FIG. 20b).

Figure 20B:
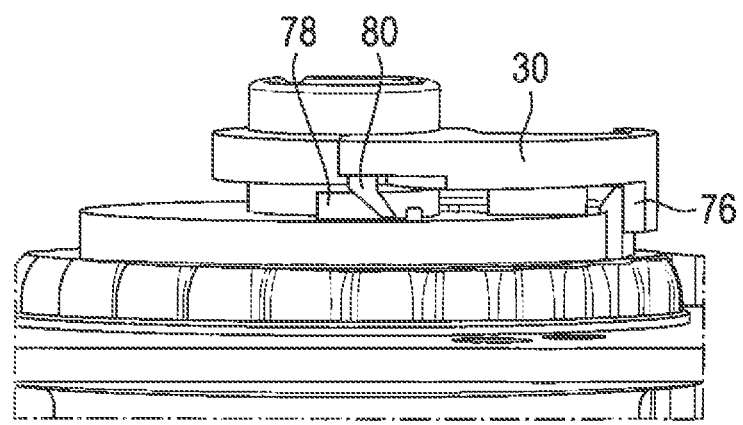
FIG. 20b shows a perspective view of the belt retractor according to the fourth embodiment with non-activated extension limiter.

In FIG. 20b the extension limiter side of the belt retractor 10 is shown in perspective. The fixing of the retaining member 30 to the contact cam 78 of the belt reel 20 via the journal 80 can be clearly inferred from this representation. The journal 80 includes an inclined surface interacting with the inclined surface of the contact cam 78. If the retaining member 30 in the form of inertia mass can follow the rotary motion of the belt reel 20 and the contact cam 78 arranged thereon, the journal 80 and the contact cam 78 remain engaged flush with adjacent areas.

Figure 20C:
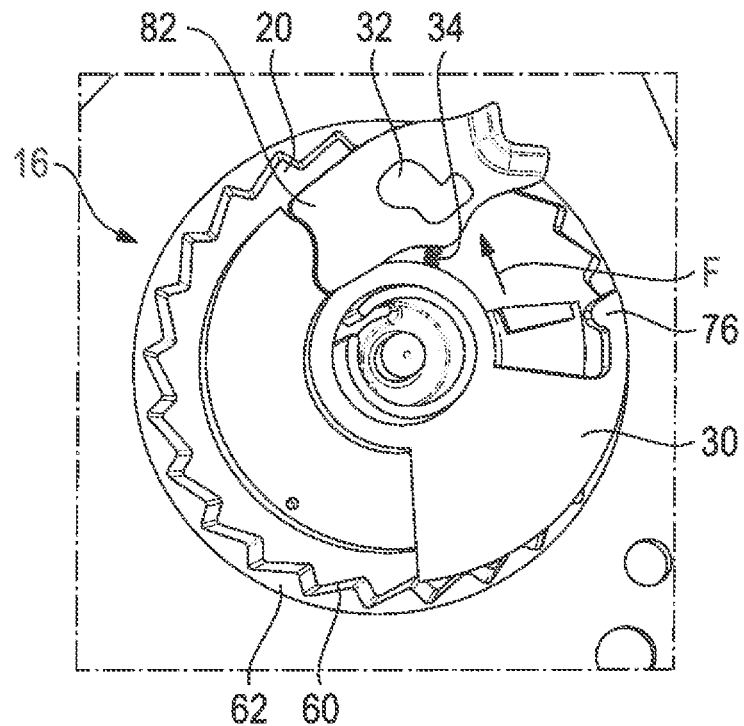
FIG. 20c shows an extension limiter side of the belt retractor according to the fourth embodiment with activated extension limiter.
Figure 20D:
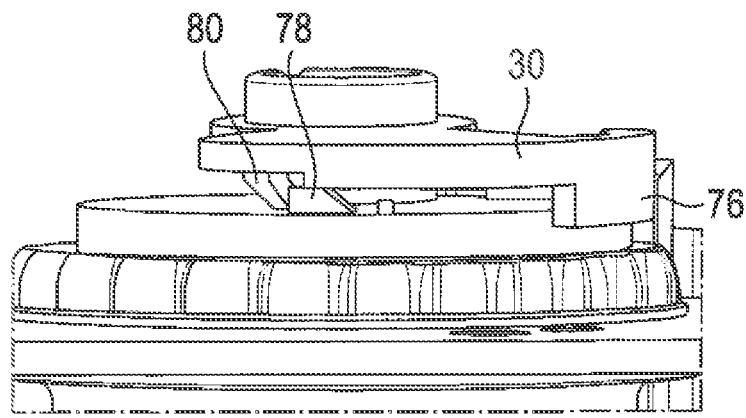
FIG. 20d shows a perspective view of the belt retractor according to the fourth embodiment with activated extension limiter.

In FIGS. 20c and 20d the extension limiter 16 is illustrated in the activated state. The retaining member 30 could no longer follow the rotary motion of the belt reel 20 due to strong rotational acceleration of the belt reel 20 and its inertia. The stop catch 32 has overcome the locking effect of the locking device 76 and has engaged in the teeth 60 of the limiting ring 62, the stop catch 32 having been directed into the teeth 60. The contact cam 78 which in the normal case catches the retaining member 30 could be overcome by the retaining member 30 and, resp., by the journal 80 of the retaining member 30 due to the high rotational acceleration (cf. FIG. 20d). The rotational acceleration which the retaining member 30 was not adapted to follow due to its inertia has been exerted by the belt tensioner 44 on the force transmission element 42 on the belt tensioner side of the belt retractor 10. In support thereof, the journal 80 can further be made of a flexible material so that the journal 80 can slide over the contact cam 78 in a defined manner at a particular rotational acceleration.

Equivalents to the afore-described embodiments, when the belt tensioner 44 is activated, the push element 54 interacts with the force transmission element 42 causing the belt reel 20 to be rotated via the force transmission element 42 against the extension direction. Since this mechanism exerts high rotational acceleration on the belt reel 20, it follows that upon activation of the belt tensioner 44 the retaining member 30 configured as inertia element can no longer follow the rotary motion of the belt reel 20. Hence the retaining member 30 is stopped relative to the rotating belt reel 20 and the stop catch 32 arranged thereon, causing the stop catch 32 to be released by the locking device 76 arranged on the retaining member 30.

The stop catch 32 is loaded by the spring 34 so that the stop catch 32 engages in the teeth 60 of the limiting ring 62 and activates the extension limiter 16 via the thread mechanism 64.

Accordingly, this embodiment constitutes a very compact embodiment of the belt retractor 10 according to the invention, as the activating mechanism for the extension limiter 16 is arranged only on one side of the belt retractor 10 and thus no switch element 28 or the like needs to be employed for bridging the belt reel 20.

As an alternative, the stop catch 32 can also be deflected without a spring 34. The stop catch 32 is driven into the teeth 60 by virtue of its inertia. After detaching from the locking device 76, the stop catch 32 is supported via the bearing point 40 to be freely movable on the belt reel 20. Because of rotation of the belt reel 20 in the unwinding direction, the stop catch 32 cannot follow the rotary motion of the belt reel 20 due to its inertia and relatively remains in space. As it is fastened to the belt reel 20 via the bearing point 40, however, the bearing point 40 rotates together with the belt reel 20 and the stop catch 32 is displaced in space so that it engages in the teeth 60 of the limiting ring 62. Thus an alternative configuration of the activation of the extension limiter 16 without the spring 34 is provided.

Figure 21A:
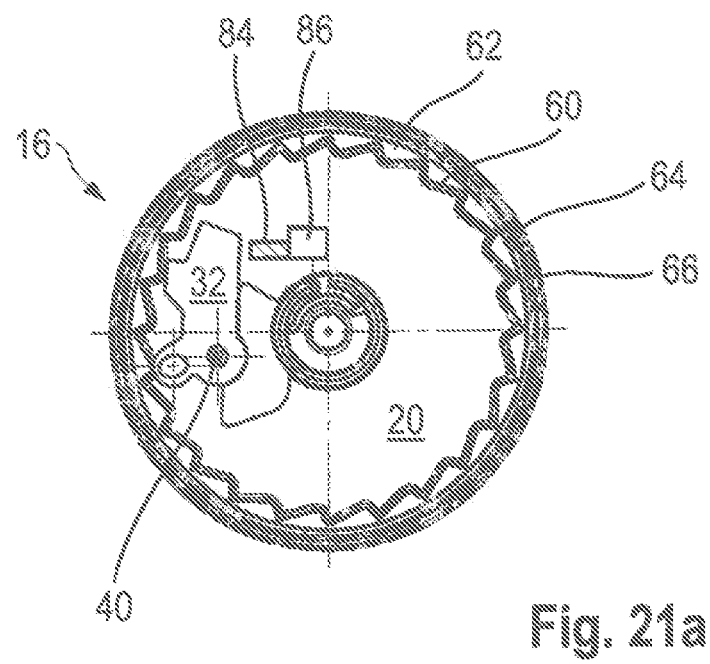
FIG. 21a shows an extension limiter side of the belt retractor according to a fifth embodiment with non-activated extension limiter.
Figure 21B:
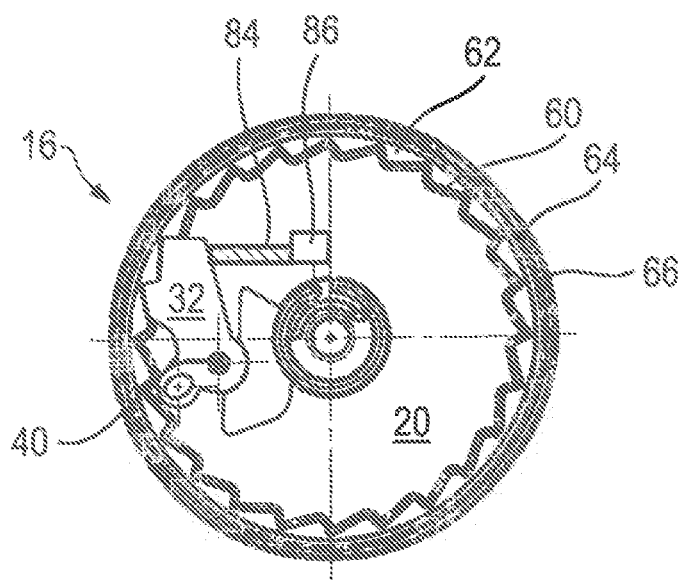
FIG. 21b shows an extension limiter side of the belt retractor of the fifth embodiment with activated extension limiter.

The FIGS. 21a and 21b illustrate a fifth embodiment of the belt retractor 10 according to the invention. The extension limiter 16 is actively controlled by an actuator 84, especially by an actor, driven by a drive 86, for example a pyrotechnic drive, so that the actuator 84 activates the extension limiter 16. The actuator 84 acts on the stop catch 32 so that the stop catch 32 engages in the teeth 60 of the limiting ring 62 and activates the extension limiter 16. Accordingly, the drive 86 is controlled and triggered by a signal which also triggers the belt tensioner 44.

In this embodiment a mechanical coupling of the activating mechanism of the extension limiter 16 to the belt tensioner mechanism via the push element 54 is not necessary, as the activation of the trigger mechanism of the extension limiter 16 is controlled by sensor or controlled by drive, respectively. Nevertheless, the extension limiter 16 is activated by the drive 86 and the actuator 84 only when also the belt tensioner 44 has been activated, because the threshold for both activations is equal and, respectively, both trigger mechanisms are activated by the same signal.

Consequently, in accordance with the invention a seat belt retractor 10 is provided which only activates the extension limiter 16 when a case of restraint is given which is severe so that it is possible that the extension limiter 16 has to exercise its limiting function at all. Triggering the extension limiter 16 in the case of minor crashes, for example fender benders, is avoided. According to the invention, the activating mechanism of the extension limiter 16 is linked with the complex and intelligent control mechanism or, resp., control censor system of the belt tensioner 44.

The invention claimed is:

1. A belt retractor (10) for a seat belt comprising a belt reel (20), a locking mechanism (12) and a force limiter (14), a belt tensioner (44) adapted to drive the belt reel (20) in a winding direction and an extension limiter (16) adapted to limit the number of revolutions of the belt reel (20) after the locking mechanism (12) is triggered in an unwinding direction in the activated state, the extension limiter (16) being communicated with the belt tensioner (44) so that the extension limiter (16) can only be activated after the belt tensioner (44) has been activated.

2. The belt retractor (10) according to claim 1, wherein the extension limiter (16) includes a stop catch (32) and a retaining member (30) adjustable between a retaining position in which the stop catch (32) is held in a deactivated position and a release position in which the stop catch (32) is released.

3. The belt retractor (10) according to claim 2, wherein a spring (34) is provided for loading the stop catch (32) from the deactivated position to an engaged position.

4. The belt retractor (10) according to claim 2, wherein the extension limiter (16) includes a limiting ring (62) which is arranged to be twistable to a limited extent and in which the stop catch (32) can engage.

5. The belt retractor (10) according to claim 2, wherein an actor (84) for the stop catch (3) is provided which is triggered by the trigger signal for a belt tensioner (44).

6. The belt retractor (10) according to claim 1, wherein a switch element (28) is provided which is adjusted upon activation of the belt tensioner (44).

7. The belt retractor (10) according to claim 6, wherein the switch element (28) is spring-loaded and can be adjusted from a home position in which the extension limiter (16) is deactivated to a release position in which the extension limiter (16) is activated.

8. The belt retractor (10) according to claim 6, wherein the switch element (28) is a pin that is movably supported in the belt reel (20).

9. The belt retractor (10) according to claim 6, wherein in the home position the switch element (28) is supported on a force transmission element (42) of the belt tensioner (44).

10. The belt retractor (10) according to claim 9, wherein the force transmission element (42) includes a force transmission wheel (48) and a switch wheel (46) which are rotatable relative to each other.

11. The belt retractor (10) according to claim 10, wherein the switch wheel (46) is provided with recesses (56), the switch element (28) being adapted to immerse into one of the recesses (56).

12. The belt retractor (10) according to claim 10, wherein the switch wheel (46) is loaded by the belt tensioner (44).

13. The belt retractor (10) according to claim 10, wherein the force transmission wheel (48) is loaded by the belt tensioner (44).

14. The belt retractor (10) according to claim 6, wherein the belt tensioner (44) includes at least one push element (54) being adjusted after triggering of the belt tensioner (44) so as to drive the belt reel (20) in the winding direction, and in that the switch element (28) is adjusted by the push element (54).

15. The belt retractor (10) according to claim 6, wherein the switch element (28) is a lever which can be adjusted from a home position in which the extension limiter (16) is deactivated to a release position in which the extension limiter (16) is activated.

16. The belt retractor (10) according to any claim 6, wherein the switch element (28) is supported on the frame (18) of the belt retractor (10).

17. The belt retractor (10) according to claim 6, wherein the switch element (28) is pivoting about an axis extending in parallel to the central axis of the belt reel (20).

18. The belt retractor (10) according to claim 1, wherein a retaining member (30) is provided which is supported to be rotatable on the belt reel (20), the retaining member (30) being detachably held in a retaining position by a locking device (76).

19. The belt retractor (10) according to claim 18, wherein the retaining member (30) is an inertia element which is rotatably arranged on the belt reel (20).

20. The belt retractor (10) according to claim 18, wherein the locking device (76) is a locking tab the locking effect of which is overcome, when a predetermined torque acts between the retaining member (30) and the belt reel (20).

21. The belt retractor (10) according to claim 18, wherein the locking device (76) is adapted to hold the retaining member (30) in a release position.

* * * * *